United States Patent

Kuhfus

[11] Patent Number: 5,130,629
[45] Date of Patent: Jul. 14, 1992

[54] TELEPHONE TERMINAL BASES

[75] Inventor: Gerd Kuhfus, Dorchester, Canada

[73] Assignee: Northern Telecom Limited, Montreal, Canada

[21] Appl. No.: 541,857

[22] Filed: Jun. 21, 1990

[51] Int. Cl.⁵ .............................................. H04M 1/00
[52] U.S. Cl. ................................ 379/429; 379/369; 379/368
[58] Field of Search ............... 379/429, 451, 368, 369, 379/370; 362/24, 428

[56] References Cited

U.S. PATENT DOCUMENTS

| | | | |
|---|---|---|---|
| 4,049,924 | 9/1977 | Chu et al. | 379/368 |
| 4,291,202 | 9/1981 | Adams et al. | 379/370 |
| 4,349,705 | 9/1982 | Kuhfus | 362/24 |
| 4,845,748 | 7/1989 | Bohannon | 379/369 |
| 4,862,499 | 8/1989 | Jekot et al. | 379/368 |

FOREIGN PATENT DOCUMENTS

| | | | |
|---|---|---|---|
| 0278853 | 12/1987 | Japan | 379/369 |
| 0076548 | 4/1988 | Japan | 379/369 |

Primary Examiner—James L. Dwyer
Assistant Examiner—Jason Chan
Attorney, Agent, or Firm—R. J. Austin

[57] ABSTRACT

A telephone terminal base having a front plate holding dialing buttons in a set and a barrier layer behind the plate to protect a printed circuit board from environmental conditions. Ribs are provided on the front plate at each side of the set of buttons to seal against the barrier layer and screws disposed outwardly of the ribs from the set of buttons compress the barrier layer against the ribs to provide a sealing action.

4 Claims, 4 Drawing Sheets

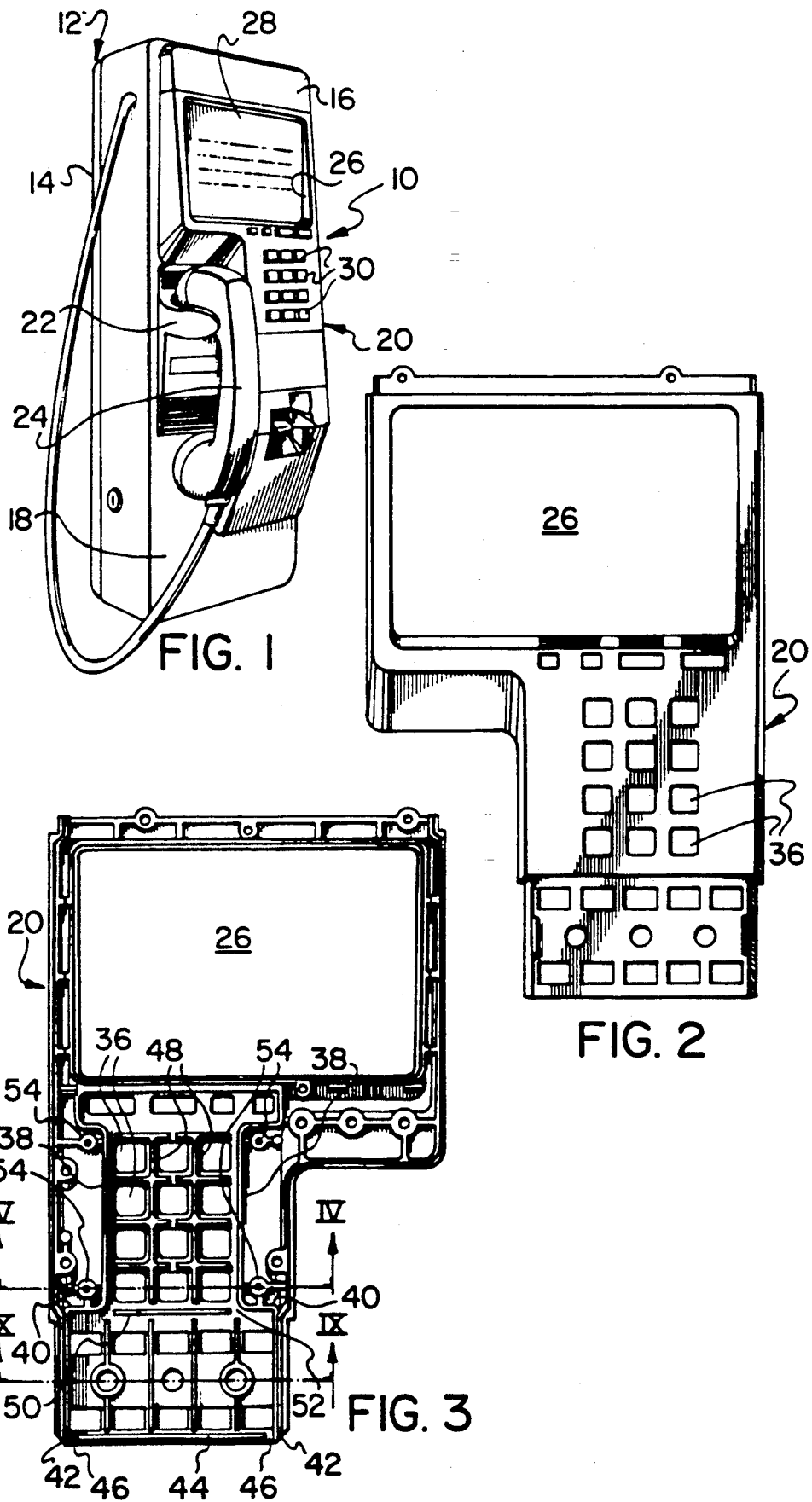

TELEPHONE TERMINAL BASES

BACKGROUND OF THE INVENTION

This invention relates to telephone terminal bases.

Many designs of telephone terminals are intended to be used in environmental conditions which may deleteriously affect operating equipment within the terminal if the equipment is brought into contact with corrosive elements in the environment. Such telephone terminal designs include those which are to be used as public telephone terminals in damp and/or corrosive atmospheric conditions which may, for instance, damage on-off conductive contacts within the terminal, thereby rendering the terminal unusable.

Conventionally, dialing is now accomplished by selectively pressing dialing buttons of a set which slideably protrude from a front of a public telephone terminal, and depressing any button applies a bridging conductor across a pair of spaced contacts on a printed circuit board for passage of a dialing signal. In an attempt to prevent surfaces of the bridging conductor of the spaced contacts from damp corrosive atmospheric damage, it is known to dispose a barrier layer between the button set and the printed circuit board. The barrier layer has a resiliently deflectable region between each button and its corresponding printed circuit board contacts and which is resiliently deflected towards the contacts each time the button is depressed. Each resiliently deflectable region has a bridging conductor disposed on one side of it and which is caused to bridge the corresponding contacts upon depression of its button so that a dialing circuit is completed to produce a dialing signal.

Unfortunately, screw-threaded means are required to hold together a front of the terminal base, the barrier layer, and the printed circuit board, and it has been found that corrosive elements from the ambient atmosphere have been bypassing barrier layers by passage along the screw threads from one side of the barrier layers to the other, and ultimately the electronic and electrical contact parts do become damaged.

SUMMARY OF THE INVENTION

The present invention provides a telephone terminal base which seeks to avoid or minimize the above problem. According to the present invention there is provided a telephone terminal base having:- a plate having a set of dialling buttons extending therethrough; a compressible barrier layer behind the plate and a printed circuit board behind the barrier layer; the compressible barrier layer having regions aligned with the buttons, said regions being selectively and resiliently deflectable upon operation of a corresponding button to bridge and close corresponding spaced contacts on a surface of the printed circuit board facing the barrier layer; a rib disposed outwardly from each side of the set of buttons and extending alongside the set of buttons; and a screw-threaded securing means disposed outwardly of each rib from the set of buttons to compress and seal the barrier layer against each rib.

With the barrier layer sealed against each rib, and with the screw-threaded means disposed in the outward position, should any corrosive elements pass along the screw-threaded means towards the side of the printed circuit board facing the barrier layer, then the seal created between a rib and the barrier layer will prevent such corrosive material from passing between the barrier layer and the printed circuit board.

The ribs are advantageously provided upon the plate, but could be provided as part of the printed circuit board.

It is also preferable that for each screw-threaded means, a boss is provided which upstands from a surface of the plate. The height of each boss relative to the ribs is such that the movement of the plates and printed circuit board together is limited so that the barrier layer is compressed by a specific amount.

BRIEF DESCRIPTION OF THE DRAWINGS

Embodiments of invention the will now be described by way of example, with reference to the accompanying drawings, in which:

FIG. 1 is an isometric view of a public telephone terminal having a base according to a first embodiment;

FIG. 2, which is of a scale larger than that of FIG. 1, is a front view of part of a front plate of the base of the terminal;

FIG. 3, which is to the same scale as FIG. 2, is a rear view of the plate of FIG. 2;

DESCRIPTION OF THE PREFERRED EMBODIMENTS

Figure 4:
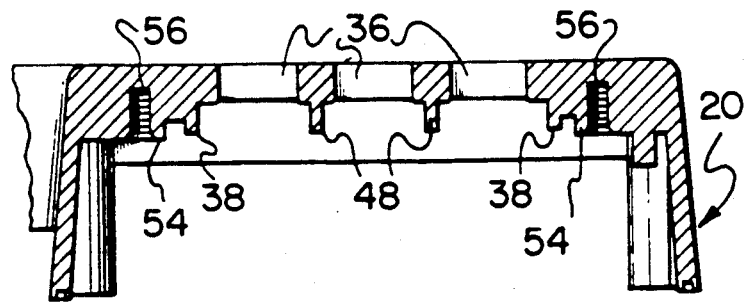
FIG. 4, which is to a larger scale than FIG. 3, is a cross-sectional view of the plate taken along line '4—4' in FIG. 3.

In first embodiment, as shown in FIG. 1, a public telephone terminal 10 comprises a base 12 having a wall mount 14 and a cover 16 which covers the mount to provide an enclosed chamber within which the electronic equipment is housed. The cover 16 has a cover base wall 18 and this also includes a die-cast metal embellishment 20 which extends outwardly from the base wall. The cover base wall includes a mount 22 for receiving a handset 24 of the telephone.

As may be seen from FIGS. 1 and 2, the metal embellishment 20 comprises an upper rectangular aperture 26 through which, in use, a telephone user may obtain information from a printed information card 28 (FIG. 1) which is retained on a rear face of the metal embellishment 20 and is sealed in position. The metal embellishment 20 also slideably receives a set of dialing buttons 30 which protrude from the front of the embellishment for operation by the user.

Figure 7:
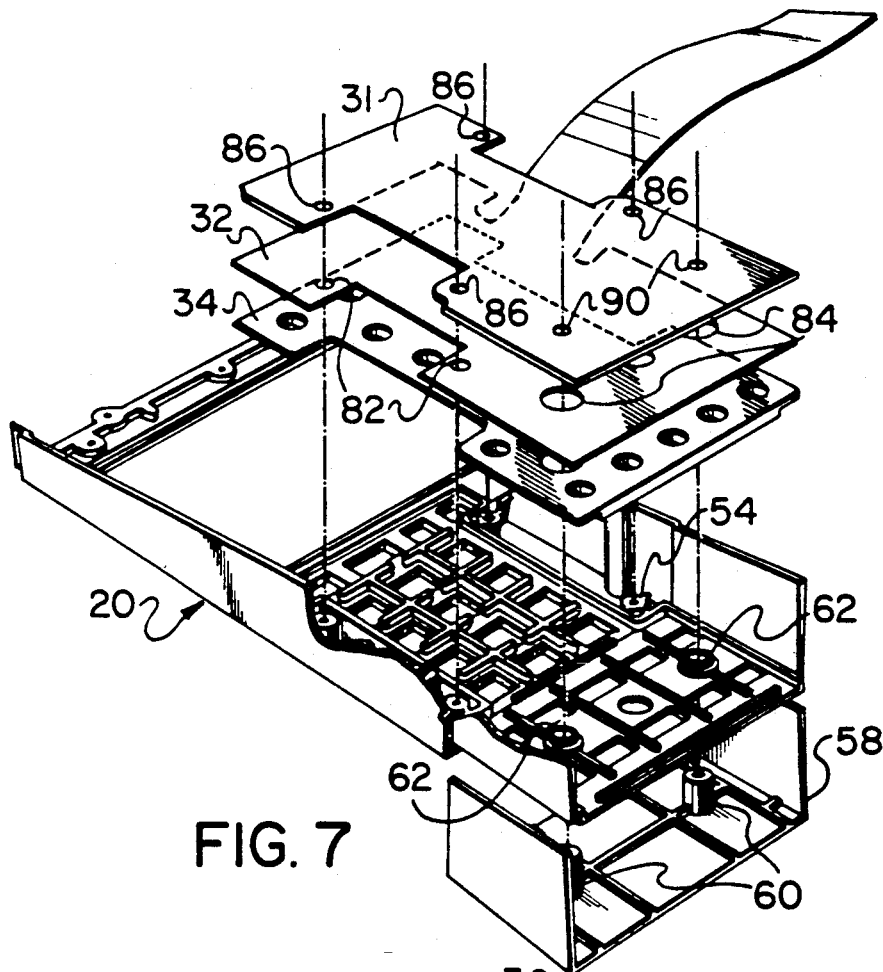
FIG. 7 is an exploded isometric view of the plate of FIGS. 2, 3 and 4 with the barrier layer of FIG. 5, the printed circuit board, and a rear plate.

The metal embellishment 20 provides a front plate of a subassembly of the telephone base, the subassembly also including, as shown particularly in FIG. 7, a rear plate 31 and a printed circuit board 32 and a compressible barrier layer 34, the printed circuit board and barrier layer being held between the rear plate 31 and the metal embellishment. The printed circuit board in this embodiment is extremely thin and flexible (referred to as a wafer) and the rear plate supports the printed circuit board.

As may be seen in greater detail from FIGS. 3 and 4, the metal embellishment 20 is provided with a set of square apertures 36 which receive the buttons 30 (not shown in these FIGS.), the apertures 36 being arranged in rectangular configuration. The metal embellishment is provided, at each side of the apertures 36, with a rib 38 which extends outwardly from the rear surface of the metal embellishment and is spaced slightly from the set of buttons. Each rib extends downwardly from a position towards the aperture 26 to a position adjacent the lower end of the set of apertures and then moves outwardly towards sides of the embellishment as shown at position 40 before extending downwardly to the lower end of the embellishment at positions 42. A horizontally extending rib 44 of the same height as the rib 42 extends along the lower edge of the metal embellishment 20 and with each of the ribs 42, provides a drainage gap 46 between the ribs as shown by FIG. 3. Further to this, interconnected vertical and horizontally extending ribs 48 lie between the apertures 36, the ribs 48 also being at the same height as the ribs 42. A further horizontally extending rib 50 lies below the lower end of the set of apertures 36 and this rib 50 also provides drainage passages 52 at each end with the ribs 38.

A screw-threaded securing means is provided for securing together the components of the subassembly. As may be seen from FIG. 3, four bosses 54 project outwardly from the rear face of the metal embellishment 20, these bosses being disposed outwardly of each rib 38 from the set of apertures 36 with the bosses in vertical alignment two on each side of the set of apertures. Screw-threaded means comprises screw-threaded bores 56 (FIG. 4) in the apertures 54. As may be seen from FIG. 4, each of the bosses 54 has a height which extends beyond the height of each of the ribs 38, 44, 48 and 50 from the rear surface of the metal embellishment 20. The reason for this difference in height will be discussed below.

In addition, the metal embellishment 20 comprises a detachable 'U'-shaped front plate element 58 (FIG. 7) which is received around the lower end of the embellishment 20 and may be replaced by some other plate (not shown) which provides some additional electronic feature for the terminal. The plate 58 is received in position with two bosses 60 formed on the plate, extending through projections 62 upstanding from the rear face of the embellishment 20. The projections 62 have short upstanding narrower diameter portions 64 (FIG. 9) which extend from ends of the projections 62 for a reason which will be described.

Figure 5:
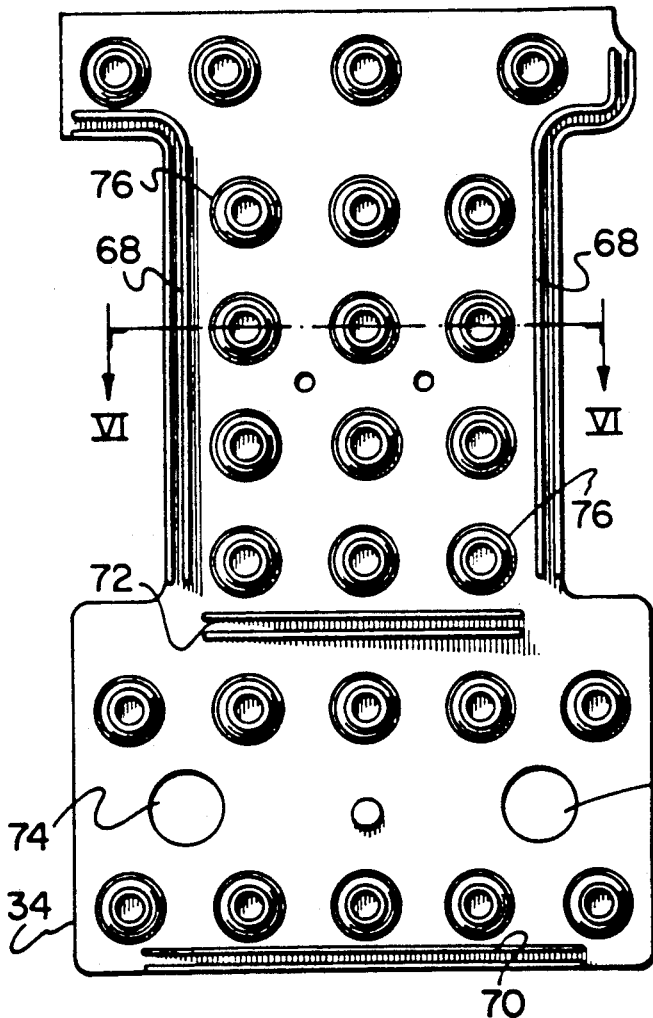
FIG. 5 is a plan view of one side of a compressible barrier layer which is to be assembled to the plate of FIGS. 2, 3 and 4.

The compressible barrier layer 34 is formed from a suitable compressible elastomeric material shaped in plan view so as to overlie all of the ribs 38, 44, 48, 50 upstanding from the rear face of the embellishment 20. As shown particularly by FIG. 5, upper side edges of the barrier layer 34 are provided with U-shaped channels 68 which receive the ribs 38 on the embellishment 20 in the subassembly with the ribs closely contacting the sides of the channels while compressing the barrier layer against the circuit board 32. Channels 70 and 72 are also provided on the barrier layer 34 for similar engagement over the ribs 44 and 50 of the metal embellishment 20. The barrier layer 34 is also formed with two apertures 74 for receiving the upstanding portions 64 of the projections 62, the diameter of the apertures 74 being such that the barrier layer rests upon ends of the projections 62 as shown in FIG. 9. While the barrier layer overlies the ribs 38 on the embellishment 20, it does not extend sufficiently far to enable it to extend over the bosses 56 also. This can be seen from FIGS. 5, 7 and 8.

Figure 6:
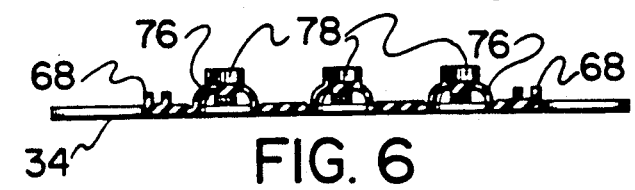
FIG. 6 is a cross-sectional view taken along line '6—6' of the barrier layer.

The barrier layer 34 is also formed with resiliently deflectable regions 76 which are aligned with the buttons 30 to lie in between the buttons and spaced contacts on the printed circuit board 32 so as to be selectively deflectable upon operation of the corresponding buttons and bridge and close the contacts for providing a dialing signal. Each of these regions 76 is integral with the barrier layer and is of basically frustoconical shape as shown for instance in FIG. 6, the narrow end of the frustocone in each case being dished and provided with a bridging conductor 78 in conventional fashion for closing the respective contacts on the printed circuit board.

The printed circuit board 32 is of substantially the same plan view as the barrier layer 34 but extends outwardly in appropriate positions (see FIG. 7) to enable it to have four holes 82 for alignment with the holes 56 in the bosses 54 for location purposes when receiving the screws for the subassembly. The printed circuit board also has two holes 84 for receiving the upstanding portions 64 of the projections 62, again for location purposes.

The rear plate 31 of the subassembly is also of substantially the same shape in plan view as the barrier layer 34, but extends outwardly further than the barrier layer so as not only to overlie the ribs 38 and 44, but also to overlie the bosses 54. The rear plate is formed with holes 86 for screws 88 passing through into the bosses 54 in the subassembly and also has two holes 90 for alignment with the screw-threaded holes in the bosses 60 of the element 58.

Figure 8:
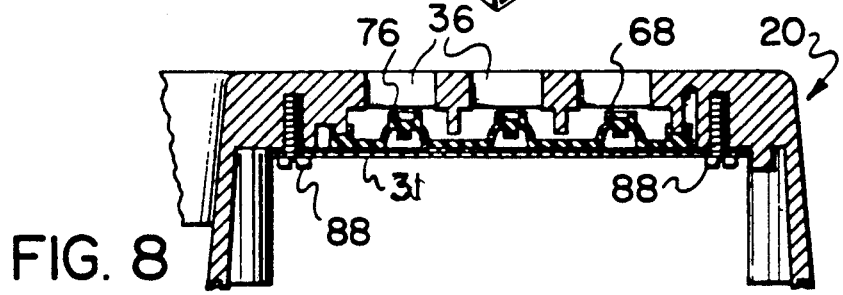
FIG. 8 is a view similar to FIG. 4 of the assembly of the parts.
Figure 9:
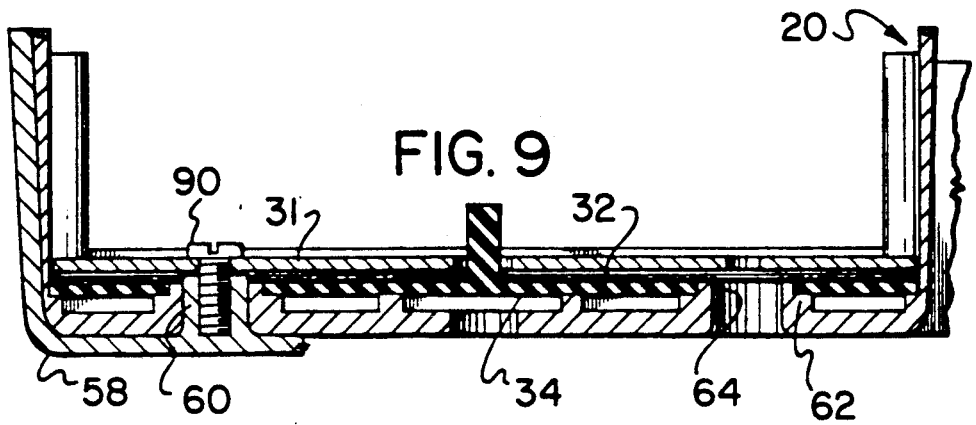
FIG. 9 is a cross-sectional view taken along line '9—9' in FIG. 3 and showing another detail of the assembly.

The elements of the assembly are placed together in the order shown in FIG. 7, i.e., with the metal embellishment 20 having the barrier layer 34 engaging with it and with the channels 38, 44 and 50 received within the appropriate recesses 68, 70 and 72 (see also FIG. 8). The printed circuit board 32 is then positioned upon the barrier layer 34 and the rear plate 31 sandwiches the printed circuit board and the barrier layer against the embellishment 20. On the front side of the embellishment 20 is disposed the plate 58 which extends around the sides of the embellishment at its lower end. Screws 88 extend through the plate 31 and the printed circuit board 32, outside of the barrier layer 34 and into the screw fitted holes 56 of the bosses 54. As shown by FIG. 8, the bosses which extend outwardly further than the ribs 38, 44 and 50, limit the movement of the rear plate 31 towards the front plate. The printed circuit board is compressed between the two plates. The ribs 38 which lie lower than the bosses 54 are spaced a specific distance from the rear plate so that the barrier layer is compressed by a specific amount between the ribs 38, 44 and 50, and the rear plate. This can also be seen by FIG. 8. In addition, screws 92 pass through the holes 90 in the rear plate 31 to secure the rear plate to the plate 58 so as to assemble the plate into position, the screws being received within the screw threads in the bosses 60. As can be shown by FIG. 9, the rear plate 31 engages the tops of bosses 60 and the shoulders 66 are spaced a specific distance from the rear plate 31 so that the barrier layer 34 is compressed by a specific amount in this particular location.

In use of the telephone terminal, it is required that the barrier layer 34 should prevent moisture which has passed through the apertures 36 and around the buttons 30 from reaching the surface of the printed circuit board which engages the barrier layer. The only way that this could possibly occur would be for the corrosive materials to pass around the edges of the barrier layer and in between the barrier layer and the printed circuit board. However, the barrier layer is sealingly compressed against the ribs 38 along the full extent of the length of the barrier layer so that these materials cannot move around the edge of the seal. It will be noticed that no screw-fitted securing means actually pass through the barrier layer and which could form passages for movement of materials through the barrier layer. This particular construction of the embodiment and other constructions according to the invention, ensures that no leakage path for corrosive materials along screw threads is possible to the surface of the printed circuit board contacting the barrier layer. In all cases in the invention, screw-fitted means which provides the compression along the edges of the barrier layer is disposed outwardly of each rib from the set of buttons. The compression of the barrier layer by the ribs therefore prevents movement of any corrosive materials not only around the edge of the barrier layer but also to the screw-fitted means for passage from one side of the barrier layer to the other.

A complete seal is therefore provided in the region of the set of buttons thus ensuring that the corrosive materials infiltrating around the buttons cannot reach the front surface of the printed circuit board. As a result, any conductive surfaces between the barrier layer and the printed circuit board are extremely unlikely to become contaminated by passage of corrosive materials into contact with the conductive surfaces.

Figure 10:
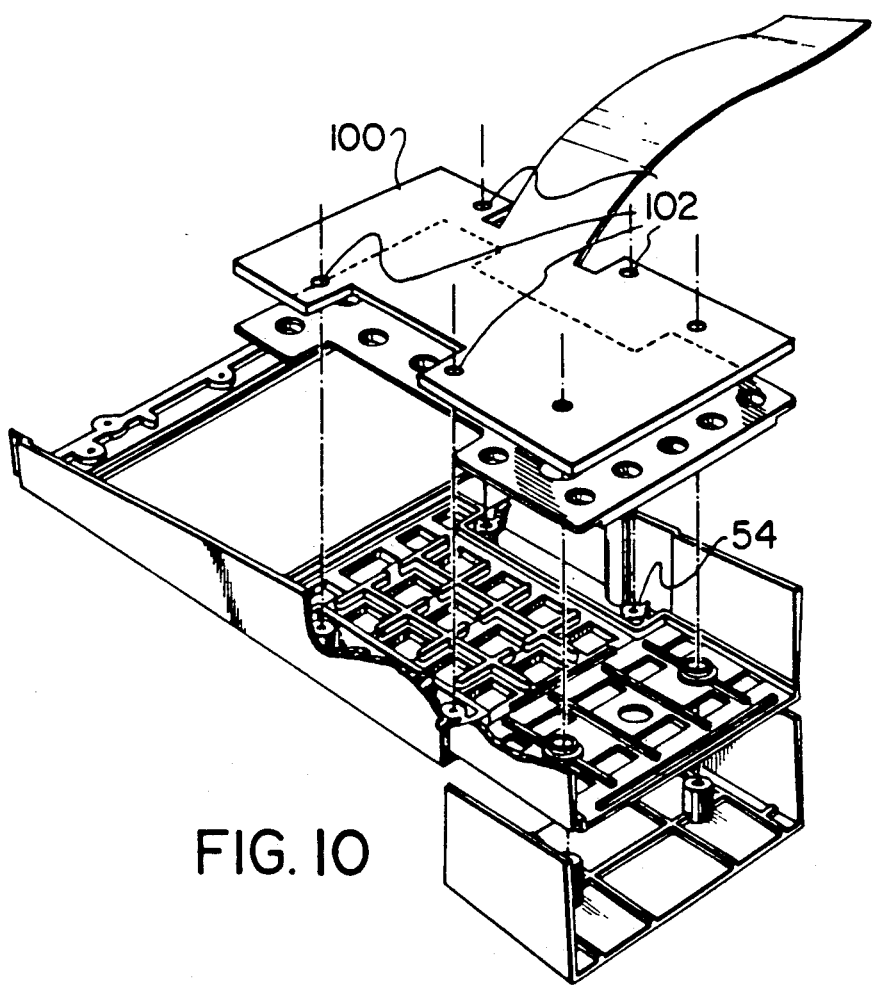
FIG. 10 is a view similar to FIG. 7 of a second embodiment.

In a second embodiment, a telephone base is basically of the same construction described in the first embodiment, except that, as shown by FIG. 10, the printed circuit board 32 and the rear plate 31 are replaced by a substantially thicker printed circuit board 100. This printed circuit board 100 has sufficient strength and rigidity that a rear plate is not necessary. The board 100 has the same shape in plan view as the rear plate 31 of the first embodiment and is formed with holes 102 for receiving screws (not shown) to be received in the screw threaded holes 56 of the bosses 54.

What is claimed is:

1. A telephone terminal base having
   a plate having a set of dialling buttons extending therethrough and also being formed with a rib means extending from a rear surface of the plate and disposed outwardly from sides of the set of buttons and extending alongside the set of buttons;
   a compressible barrier layer behind the plate and a printed circuit board behind the barrier layer;
   the compressible barrier layer having regions aligned with the buttons, said regions being selectively and resiliently deflectable upon operation of a corresponding button to bridge and close corresponding spaced contacts on a surface of the printed circuit board facing the barrier layer, the barrier layer having a front face formed with channels which receive the rib means for location of the barrier layer with the rib means compressing the barrier layer against the printed circuit board and the channels having sides which are closely contacted by the rib means; and
   a screw-threaded securing means disposed outwardly of said rib means from the set of buttons to compress and seal the barrier layer against the rib means.

2. A base according to claim 1 wherein the screw threaded securing means comprising bosses formed from the rear surface of the plate a female screw thread formed into each boss, and the printed circuit board is formed with holes aligned with the female screw threads with screws passing through the holes and into the bosses to hold the barrier layer between the printed circuit board and the plate, and the height of each boss is such that the movement of the printed circuit board and the plate together is limited and the distance between the rib means and the printed circuit board is thereby 3. A telephone terminal base having
   a plate having a set of dialling buttons extending therethrough and also being formed with a rib means extending rearwardly from the plate and disposed outwardly from sides of the set of buttons and extending alongside the set of buttons;
   a compressible barrier layer behind the plate and a printed circuit board behind the barrier layer;
   the compressible barrier layer having regions aligned with the buttons, said regions being selectively and resiliently deflectable upon operation of a corresponding button to bridge and close corresponding spaced contacts on a surface of the printed circuit board facing the barrier layer;
   a screw-threaded securing means disposed outwardly of said rib means from the set of buttons to compress and seal the barrier layer against the rib means; and
   at a position remote from the set of buttons, a detachable front plate element is attached to the plate, the detachable front plate element secured by further screw-threaded means which pass through the printed circuit board and into projections on a rear surface of the detachable front plate element, the projections having upstanding narrow diameter portions extending through holes in the barrier layer, the upstanding narrow diameter portions limiting the movement of the printed circuit board towards the plate so as to compress the barrier layer by a specific amount between the projections and the printed circuit board.

4. A telephone terminal base having:-
   a front plate having a set of dialling buttons extending therethrough and also being formed with a rib means extending rearwardly from the plate and disposed outwardly from sides of the set of buttons and extending alongside the set of buttons;
   a compressible barrier layer behind the front plate, a flexible printed circuit board behind the barrier layer, and a rear plate behind the printed circuit board to support the printed circuit board;
   the compressible barrier layer having regions aligned with the buttons, said regions being selectively and resiliently deflectable upon operation of a corresponding button to bridge and close corresponding spaced contacts on a surface of the printed circuit board facing the barrier layer;
   a screw-threaded securing means disposed outwardly of the rib means from the set of buttons and extending between the front and rear plates to compress and seal the barrier layer against the rib means; and at a position remote from the set of buttons, a detachable front plate element is attached to the front plate, the detachable front plate element secured by further screw-threaded means which pass through the rear plate and into projections on a rear surface of the detachable front plate element, the projections having upstanding narrow diameter portions extending through holes in the barrier layer, the upstanding narrow diameter portions limiting the movement of the rear plate towards the front plate so as to compress the barrier layer by a specific amount between the projections and the rear plate.

* * * * *